United States Patent
Grobler

(10) Patent No.: US 12,231,576 B2
(45) Date of Patent: Feb. 18, 2025

(54) SECURE DIGITAL SIGNING OF A DOCUMENT

(71) Applicant: Nimaty Advisory LLP, East Horsley (GB)

(72) Inventor: Jacobus Grobler, Strand (ZA)

(73) Assignee: Nimaty Advisory LLP, East Horsley (GB)

( * ) Notice: Subject to any disclaimer, the term of this patent is extended or adjusted under 35 U.S.C. 154(b) by 322 days.

(21) Appl. No.: 17/591,136

(22) Filed: Feb. 2, 2022

(65) Prior Publication Data

US 2022/0286294 A1 Sep. 8, 2022

(51) Int. Cl.
*H04L 9/32* (2006.01)
*H04L 9/14* (2006.01)

(52) U.S. Cl.
CPC .............. *H04L 9/3247* (2013.01); *H04L 9/14* (2013.01)

(58) Field of Classification Search
CPC ....... H04L 9/3247; H04L 9/14; H04L 9/3231; H04L 9/3268; H04L 9/32; G06F 21/64; G06F 2221/2111; G06F 21/32; G06Q 20/3825
See application file for complete search history.

(56) References Cited

U.S. PATENT DOCUMENTS

| | | | |
|---|---|---|---|
| 7,237,114 B1 | 6/2007 | Rosenberg | |
| 7,490,240 B2 * | 2/2009 | Scheidt | H04L 9/3033 713/168 |
| 9,176,942 B1 * | 11/2015 | McLaughlin | G06F 40/166 |
| 9,350,554 B2 | 5/2016 | Oswalt | |
| 9,531,546 B2 | 12/2016 | Novack et al. | |
| 9,628,462 B2 | 4/2017 | Gonser et al. | |
| 10,454,677 B1 * | 10/2019 | Nagelberg | G06V 40/1365 |
| 2015/0067347 A1 | 3/2015 | Dease et al. | |
| 2017/0070484 A1 * | 3/2017 | Kruse | H04L 9/14 |
| 2018/0167208 A1 * | 6/2018 | Le Saint | H04L 9/3265 |
| 2019/0173946 A1 * | 6/2019 | Varma | H04L 67/52 |
| 2020/0301979 A1 * | 9/2020 | Alexiades | G06F 16/93 |

FOREIGN PATENT DOCUMENTS

| | | |
|---|---|---|
| RU | 2699830 C2 | 9/2019 |
| WO | 2018176140 A1 | 10/2018 |

OTHER PUBLICATIONS

"User Identification and Authentication for E-Signature Transactions the Right Authentication Methods to Prove Who Sign," White Paper, ONESPAN, 17 pages, Jun. 2018.

\* cited by examiner

*Primary Examiner* — Mohammed Waliullah
(74) *Attorney, Agent, or Firm* — Tucker Ellis LLP

(57) ABSTRACT

A system and method for orchestrating secure digital signing of a document is provided. In a method a user may be required to sign a document using a digital signature. The method may include obtaining data elements, including a biometric data element and a location data element, associated with the user to verify the user. The authenticity of the data elements may be verified by means of cryptographic attestation and by comparing the biometric data element with user data stored in a user record. In response to verifying the data elements, a payload may be generated, including the data elements, and a hash algorithm may be performed on the payload. A hash of the payload obtained by the hash algorithm and a document identifier may be sent to a secure module unique to the user, via a signing application, for signing of the document.

17 Claims, 8 Drawing Sheets

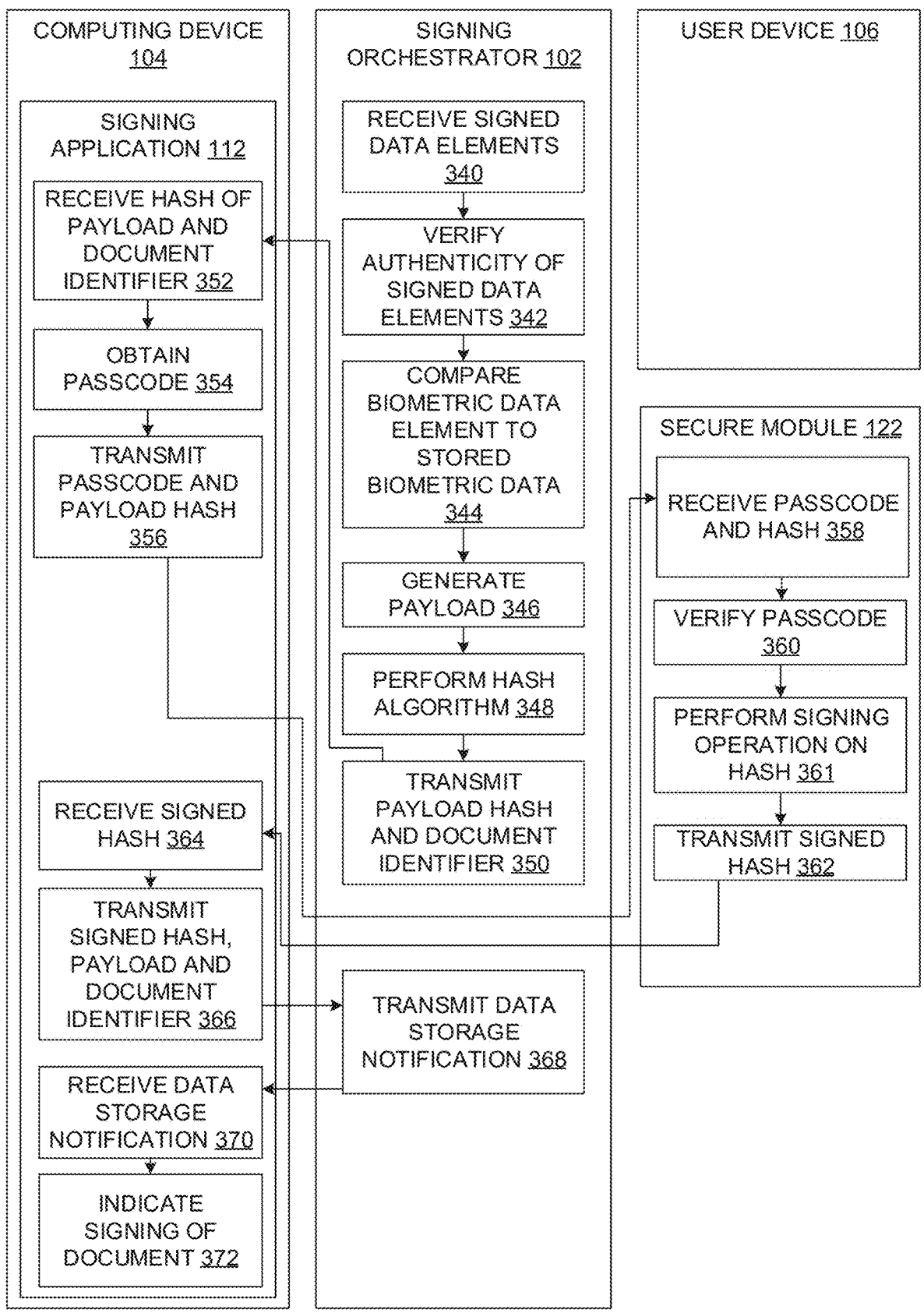
FIGURE 3A (CONTINUE)

SECURE DIGITAL SIGNING OF A DOCUMENT

RELATED APPLICATIONS

This application claims priority from United Kingdom Patent Application No. 2101434.5 filed Feb. 2, 2021, which is hereby incorporated herein by reference.

FIELD OF THE INVENTION

This invention relates to digital signing of documents. In particular, the invention relates to the secure signing of a digital document in a way that links a signer, a location and the document together.

BACKGROUND TO THE INVENTION

Signing operations, such as the signing of documents and agreements, play a major part in business operations and transactions conducted on a daily basis. With an increase in technology in recent times, the majority of these signing operations are faceless and conducted remotely. For example, parties to a transaction could be located thousands of kilometres apart but still sign a document electronically to make the document legally binding and prove that the parties both agree to the terms of the transaction.

Due to the sensitivity of some of the transactions and the implications that these transactions may have on the relevant parties, it is important to authenticate that the party signing the document, the signor, is in fact the legitimate signor and not a nefarious third party behaving as the signor. By authenticating the signor, it is possible to create a trusted environment for all parties to the transaction. For example, authentication may be required to prevent miscreants from illegitimately signing a document without the knowledge of the legitimate signor.

Accordingly, authentication of the signor plays a crucial role in applications requiring a digital signature and it is the layer of security that is put in place to associate a digital signature to the party signing. By authenticating the signor, the risk of repudiation is reduced, and strong evidence is provided that the signor is indeed a legitimate signor. Authentication helps to guarantee enforceability of the digitally signed document and provides a sense of security to the parties affected by the signing of the document.

A well-known form of authentication is multi-factor authentication which combines at least two independent credentials, generally referred to as authentication factors, to verify the identity of the signor. By requiring at least two factors to generate and authorise the digital signature, a more layered form of defence is implemented, making it more difficult for illegitimate third parties to sign on behalf of the legitimate signor.

In a typical case the signor would be required to provide as one factor a username and password (referred to as a knowledge factor), and as a second factor a biometric, such as a fingerprint or voice recording, of the signor (referred to as a "something you are" factor) or a one-time pin sent to a device in the possession of the signor (referred to as a something you have/own factor) in order to generate and authenticate a digital signature.

While this multi-layered form of security has greatly reduced the occurrence of fraudulent digital signatures, some signers may provide independent third parties with the necessary authentication information and enable these third parties to sign on their behalf, without the knowledge or consent of the other party. In such instances the signed document may be null and void, as the signor was in fact not the legitimate signor.

Accordingly, there is scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method for orchestrating digital signing of a document using embedded cryptographic verification of a signing location conducted at a signing orchestrator, the method comprising:

receiving a request for data elements from a signing application and, in response to receiving the request, initiating obtaining of the data elements;

receiving signed data elements, including a location data element and a biometric data element associated with a user, the data elements having been obtained from a user device configured to sign the data elements with an attestation key;

verifying the authenticity of the signed data elements using a system attestation certificate and comparing the biometric data element to user data stored in a user record;

in response to verifying the signed data elements, generating a payload including the location data element, the biometric data element and data associated with the document and performing a hash algorithm on the payload to calculate a hash of the payload; and transmitting the hash of the payload and a document identifier to the signing application for signing of the document.

Initiating obtaining the data elements may include transmitting a data element request to the user device and the user device prompting the user to provide the biometric data elements. In some embodiments prompting the user to provide the biometric data element may include presenting the user with a description of the document to be signed.

The method may provide for the data elements to be signed with a system attestation key which may be stored in a secure storage of the user device. The system attestation key may be associated with the attestation certificate which is enrolled at the signing orchestrator and which may be used to verify the authenticity of the data elements signed with the system attestation key.

The payload including the data elements may additionally include at least one of a timestamp and the document identifier.

The method may include for the biometric data element to be associated with the user and for the location data element to be associated with the user device.

The user data stored in the user record may include user biometric data and user location data obtained from the user during an enrolment process. Therefore, the step of comparing the biometric data element to user data stored in a user record may include comparing the biometric data element to the user biometric data obtained from the user during the enrolment process.

The method may further include initiating a signing session in response to receiving the signing request. In some embodiments the signed data elements may be stored in a storage location of the signing orchestrator at least for the duration of the signing session.

The method may include for one or more additional documents to be signed during the signing session. If such one or more additional documents are to be signed during the signing session, the method may include, using the stored signed data elements to generate a payload for each of the one or more additional documents.

The signing application may be a web-based application executing on a computing device associated with the user.

In accordance with a further aspect of the invention there is provided a computer-implemented method for orchestrating digital signing of a document using embedded cryptographic verification of a signing location, the method being conducted at a signing application executing on a computing device associated with a user and comprising:
  requesting data elements from a signing orchestrator for identifying the user initiating a signing request;
  receiving a hash of a payload including the data elements and data associated with the document, and a document identifier, wherein the signing orchestrator receives signed data elements, including a location data element and a biometric data element associated with the user, obtained from a user device configured to sign the data elements with an attestation key and verifies the authenticity of the signed data elements using a system attestation certificate and compares the biometric data element to user data stored in a user record;
  prompting the user for a passcode associated with a secure module; and
  transmitting the user passcode and the hash of the payload to the secure module configured to verify the user passcode and perform signing of the hash.

The method may include receiving the signed hash from the secure module and transmitting the signed hash to the signing orchestrator. The signed hash may represent a digital signature of the user. The signing orchestrator may store the signed hash for subsequent use.

The method may include for the secure module to be a Hardware Security Module (HSM) configured to store a private key unique to the user, and for the private key to be used to cryptographically sign the hash.

In accordance with a further aspect of the invention there is provided a system for orchestrating digital signing of a document using embedded cryptographic verification of a signing location including a signing orchestrator, the signing orchestrator having a memory for storing computer-readable program code and a processor for executing the computer-readable program code, the signing orchestrator comprising:
  a data request receiving component for receiving a request for data elements from a signing application and, in response to receiving the request, initiating obtaining of the data elements;
  a data element receiving component for receiving signed data elements, including a location data element and a biometric data element associated with a user, the data elements having been obtained from a user device configured to sign the data elements with an attestation key;
  an authenticity verifying component for verifying the authenticity of the signed data elements using a system attestation certificate and comparing the biometric data element to user data stored in a user record;
  a payload generating component for, in response to verifying the signed data elements, generating a payload including the location data element, the biometric data element and data associated with the document;
  a hash algorithm performing component for performing a hash algorithm on the payload to calculate a hash of the payload; and
  a hash transmitting component for transmitting the hash of the payload and a document identifier to the signing application for signing of the document.

In accordance with a further aspect of the invention there is provided a system for orchestrating digital signing of a document using embedded cryptographic verification of a signing location including a signing application executing on a computing device associated with a user, the computing device having a memory for storing computer-readable program code and a processor for executing the computer-readable program code, the computing device comprising:
  a data element requesting component for requesting data elements from a signing orchestrator for identifying the user initiating a signing request;
  a hash receiving component for receiving a hash of a payload including the data elements and data associated with the document, and a document identifier, wherein the signing orchestrator receives signed data elements, including a location data element and a biometric data element associated with the user, obtained from a user device configured to sign the data elements with an attestation key and verifies the authenticity of the signed data elements using a system attestation certificate and compares the biometric data element to user data stored in a user record;
  a passcode prompting component for prompting the user for a passcode associated with a secure module; and
  a passcode transmitting component for transmitting the user passcode and the hash of the payload to the secure module configured to verify the user passcode and perform signing of the hash.

The secure module may be directly attached to, or integral with the computing device associated with the user.

In accordance with a further aspect of the invention there is provided a computer program product for orchestrating digital signing of a document using embedded cryptographic verification of a signing location, the computer program product comprising a computer-readable medium having stored computer-readable program code for performing the steps of:
  receiving a request for data elements from a signing application and, in response to receiving the request, initiating obtaining of the data elements;
  receiving signed data elements, including a location data element and a biometric data element associated with a user, the data elements having been obtained from a user device configured to sign the data elements with an attestation key;
  verifying the authenticity of the signed data elements using a system attestation certificate and comparing the biometric data element to user data stored in a user record;
  in response to verifying the signed data elements, generating a payload including the location data element, the biometric data element and data associated with the document and performing a hash algorithm on the payload to calculate a hash of the payload; and transmitting the hash of the payload and a document identifier to the signing application for signing of the document.

In accordance with a further aspect of the invention there is provided a computer program product for orchestrating digital signing of a document using embedded cryptographic verification of a signing location, the computer program product comprising a computer-readable medium having stored computer-readable program code for performing the steps of:

requesting data elements from a signing orchestrator for identifying the user initiating a signing request;

receiving a hash of a payload including the data elements and data associated with the document, and a document identifier, wherein the signing orchestrator receives signed data elements, including a location data element and a biometric data element associated with the user, obtained from a user device configured to sign the data elements with an attestation key and verifies the authenticity of the signed data elements using a system attestation certificate and compares the biometric data element to user data stored in a user record;

prompting the user for a passcode associated with a secure module; and transmitting the user passcode and the hash of the payload to the secure module configured to verify the user passcode and perform signing of the hash.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1:
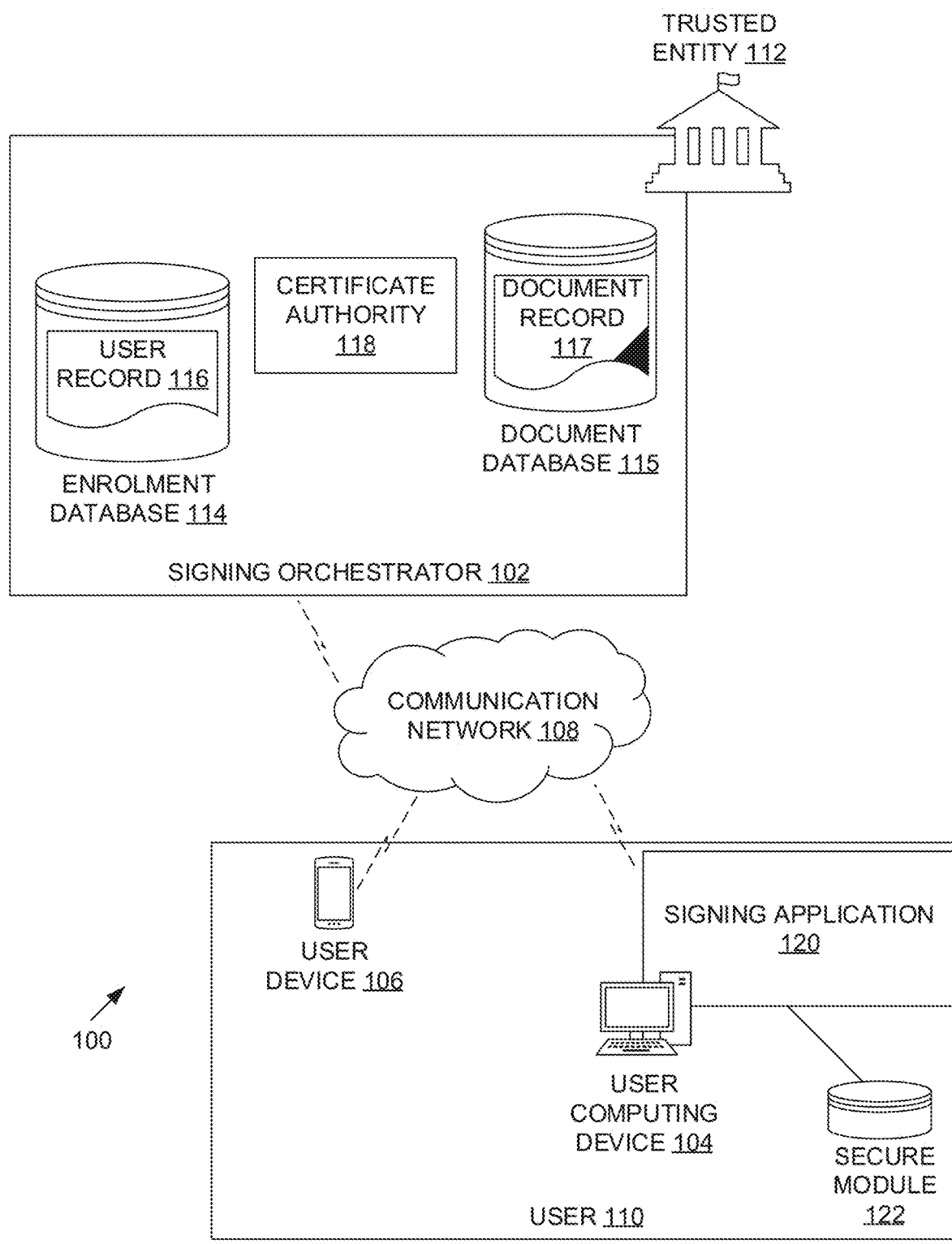
FIG. 1 is a schematic diagram which illustrates an exemplary embodiment of a system for orchestrating digital signing of a document using embedded cryptographic verification of a signing location in accordance with aspects of the present disclosure.

Aspects of this disclosure are directed towards systems and methods for secure digital signing of a document. In order to enable secure digital signing of the document, the signature used to sign the document may include strong user identification, strong user authentication and location data.

The identity of the signor of the document may be authenticated using multiple factors. The multi-factor authentication may be based on two or more of validations of an inherence factor ("something I am"), a knowledge factor ("something I know") or a possession factor ("something I have"), as will be elaborated on in greater detail below. The security provided by the multi-factor authentication described herein may for example be sufficient to meet the requirements of strong consumer authentication (SCA) as defined in the Revised Payment Services Directive ("PSD2"). Strong user identification and authentication may be required to minimise the legal risk of repudiation of a document and present strong evidence of compliance in terms of "who" signed the document.

In some embodiments a user, performing the role of a signor, may be registered for the signing of documents during an enrolment procedure. The user may registered using at least one of a software application resident on a computing device associated with the user and installed and executable thereon and a software application resident on a user device associated with the user and installed and excitable thereon. Aspects of the present disclosure are directed towards embodiments in which the software application/s is a web browser and towards embodiments in which the software application/s is a customized "native" software application downloadable from an application repository (or otherwise installable on the relevant device) and configured to perform a set of specific functions.

The user may be required to sign a document in order to comply with pre-configured compliance regulations governing business practices, for example. In an example scenario, the user may receive a communication, such as a message or email, from a signing administrator requesting the user to sign the document. The user may preview the document that needs to be signed, and, if the user approves the document, initiate a signing process. The signing process may include the user accessing the software application, which will be referred to as a 'signing application' herein, and request signing of the document. In some embodiments the user may be authenticated using a FIDO functionality facilitated by a secure module accessible to the user before the user may initiate the signing process. Once the user has approved initiation of the signing process a signing orchestrator, performing the duties of a signing facilitator, may initiate the process. The signing application may request data elements including one or more of location data and biometric data of the user from the server. In response, to receiving the request, the signing orchestrator may initiate obtaining of the data elements from a user device associated with the user. In some embodiments the user device may be a mobile phone, whereas in other embodiments the user device may be any other hardware component capable of communicating with the signing orchestrator.

The signing orchestrator may transmit a prompt to the user device prompting the user to provide a biometric associated with the user which was registered with the server during enrolment. A software application may be installed on the user device during enrolment via which the prompt may be transmitted. The prompt may include document information which indicates the document to be signed to the user. For example, a message such as "Please provide fingerprint for signing of document A1234" may be displayed to the user on the user device. The user inputs the registered biometric, for example a fingerprint, into the user device in order to satisfy the request of the signing orchestrator. Once the user has input the biometric, the software application collects the location data of the user device, for example via a GPS or GNSS of the user device. In some embodiments the location data may be obtained in parallel with the biometric data. The data elements obtained by via the user device may be signed with an attestation key associated with the system. The attestation key may have a corresponding attestation certificate stored and registered with the signing orchestrator.

The signing orchestrator receives the signed data elements and verifies the authenticity of the data elements using the system attestation certificate. The biometric data provided by the user may be compared to previously registered user biometric data which was provided by the user during enrolment to verify the user. This may satisfy the inherence factor for authentication as mentioned above.

The signing orchestrator generates a payload, which includes one or more of the document to be signed, a document identifier, the data elements and a timestamp and perform a hash algorithm on the payload to calculate a cryptographic hash thereof. The signing orchestrator transmits the cryptographic hash and the document identifier to the signing application.

The signing application receives the cryptographic hash and the document identifier and transmits the hash and document identifier to the secure module for signing of the cryptographic hash. The secure module may require the user to identify himself/herself and prompts the user for a passcode. The passcode may be a passcode provided to the user during enrolment and may be associated with the particular secure module. The user inputs the passcode and the secure module verifies if the passcode is the correct passcode. If the passcode is incorrect, the secure module rejects the signing request. If the passcode is correct, however, the secure module signs the cryptographic hash and transmits the signed hash to the signing application. The passcode requirement may satisfy a knowledge factor for authentication as the passcode is only known to the verified user.

The signing application transmits the payload, signed hash and document identifier to the server, where it may be stored in the user record for subsequent use. For example, to verify the data used to sign the document. The server will notify the user, via the signing application, that the signing data has been successfully stored.

The signed hash may be a digital user signature for signing of a document.

FIG. 1 is a schematic diagram which illustrates an exemplary system (100) for orchestrating the digital signing of a document using embedded cryptographic verification of a signing location according to aspects of the present disclosure. Various combinations of the described features and aspects may be used in a given implementation.

The system may include a signing orchestrator (102), user computing device (104) and a user device (106) in data communication with each other via an appropriate communication network (108), such as the Internet or any other suitable public communication network. The user computing device (104) and the user device (106) may be in possession and under the control of a user (110), representing a signor in the particular application. It should be appreciated that even though only one user (110) is shown, a plurality of users controlling a plurality of devices (104, 106) may be present in a practical implementation.

The signing orchestrator (102) may be associated with a trusted entity (112), such as a signing facilitator. The user (110) may be registered with the trusted entity (112) during an enrolment procedure, and at least one of the user computing device (104) and the user device (106) may be registered or enrolled with the signing orchestrator (102).

The signing orchestrator (102) may be maintained by the trusted entity (112) providing a signing service to a user. In some embodiments, the trusted entity may be a compliance service provider providing compliance and authentication services to other entities. The signing orchestrator (102) may be any suitable computing device configured to perform the role of a server such as a server cluster, a distributed server, a cloud-based server or the like.

The signing orchestrator (102) may have access to and may maintain an enrolment database (114) in which a user record (116) associated with the user (110) is stored. The user record (116) may include one or more of: a user identifier which uniquely identifies the user; user biometric data; and, user location data which have been provided at the time of enrolment.

The signing orchestrator (102) may further have access to and maintain a document database (115) in which a document record (117) associated with each respective document to be signed is stored. Each document to be signed may be associated with a unique document identifier which may be allocated to the document when the document is uploaded to the database. The document record (117) may include one or more of: a document identifier; a document description; a document classification; and, identifiers of users having access to or signing rights to the document. It should be appreciated that in some embodiments the document database (115) may be maintained by a server other than the signing orchestrator under the control and supervision of the trusted entity.

The user computing device (104) may be any suitable computing device under the control of the user (110), such as a laptop computer, a tablet computer, a mobile phone, or the like. The user computing device (104) may have a signing application (120) resident therein and installed or executable thereon. In some cases, the signing application may be a native signing application developed by the trusted entity to perform a set of specific functions. In some cases, the signing application may be a web browser provided by a third-party web browser developer (such as one of the Chrome™, Safari™, Firefox™ or Edge™ web browsers, each of which is a trademark of its respective proprietor). In some cases, the signing application may be a native application developed by a third party and including a software-development kit (SDK) developed, maintained and/or controlled by the trusted entity. It should be appreciated that the signing application may be provided as part of a web application so as to enable signing operations via the signing application directly from a browser.

The term "signing application session" as used herein may be used to refer to a particular occurrence of the signing application executing on the user computing device. Accordingly, the signing application session on the user computing device is a particular and unique occurrence of the signing application.

The signing application (120) may have access to a secure module (122) associated with the user. The storage (122) may be secure in that is it protected by way of software and/or hardware configuration from other applications executing on the computing device and/or from external access. The secure module (122) may therefore be for the exclusive use of the signing application (120) and any data stored in the secure module is protected from access and/or interference by other applications, instances, devices and/or third parties. The secure module (122) may be provided by a hardware security module (HSM) accessible to the user computing device (104). The secure module (122) may store cryptographic key(s) which may be stored for exclusive use by the signing application (120) during a signing application session. The HSM may be provided to- and associated with the user during enrolment.

The user device (106) may be any suitable device associated with the user (110) and which is registered with the signing orchestrator (102) during enrolment. The signing orchestrator (102) may be configured to communicate with the user device (106) via a suitable communication network, such as the Internet or any other communication network. For example, the signing orchestrator may transmit a request to the user device prompting the user to provide a required input. In some cases the user request may be in the form of a USSD prompt, or in some embodiments the request may be in the form of a push notification by means of a software application executing on the user device. Accordingly, the device (106) may be any device capable of communicating with the signing orchestrator (102) and under the control of the user (110). The user device (106) may, for example, be a mobile phone, a tablet computer, a wearable computing device, personal digital assistant, laptop computer, a virtual digital assistant or the like.

The user device may have access to one or more data element sources which may be used to obtain data elements associated with the user. The data element sources may for example include location data element sources such as a Global Positioning System (GPS) of the device, or any other satellite system such as a Global Navigation Satellite System (GNSS) of the device, and biometric data element sources such as a voice recognition software, a fingerprint scanner, facial recognition software, or the like.

The user device (106) may have access to a system attestation key which may be used to sign the data elements obtained from the data element sources. The attestation key may have a corresponding attestation certificate which is stored at the signing orchestrator and which may be used to verify the authenticity of the data elements. The system attestation key may be stored in a secure key storage location of the user device (106) and which is only accessible to the device.

In some embodiments the signing orchestrator may have access to or may provide a certificate authority (CA) (118). The CA (118) may form part of the signing orchestrator (102) or may be provided or hosted by an independent third party which is trusted by the entity (112) and other entities. In some implementations, the CA may implement closed PKI (public key infrastructure) in terms of which proprietary PKI software issues digital certificates to a limited, controlled community of users (e.g. users registered with the trusted entity). In such an implementation, root certificates are not available to browsers or other applications. This is different from a CA implementing open PKI in terms of which applications can interface seamlessly with certificates issued under an open PKI, the roots of which are already embedded. In other implementations, the CA may however implement open PKI.

The CA (118) may be configured to generate, sign, provision, and/or issue attestation certificates to software applications. Such attestation certificates may be X.509 certificates and may include a certificate identifier, which may for example be generated and/or signed by the CA and uniquely associated with the attestation certificate (and hence the signing application session too). The certificate identifier may be a globally unique identifier. In such an embodiment the attestation certificate may be enrolled with the signing orchestrator and associated with the attestation key securely stored at the user device (106). The signing orchestrator may verify the authenticity of any data received from the user device (106) which is signed with the attestation key by means of the issued attestation certificate.

It should be appreciated that in some embodiments the computing device (104) and the user device (106) may be the same device. Alternatively, the user device (106) may be a device configured to connect to the computing device (104), by means of a wired connection or wirelessly, in which case the user device (106) may communicate with the signing orchestrator (102) via the computing device (104).

The system (100) as described above may implement a method for orchestrating digital signing of a document using embedded cryptographic verification of a signing location.

Figure 2A:
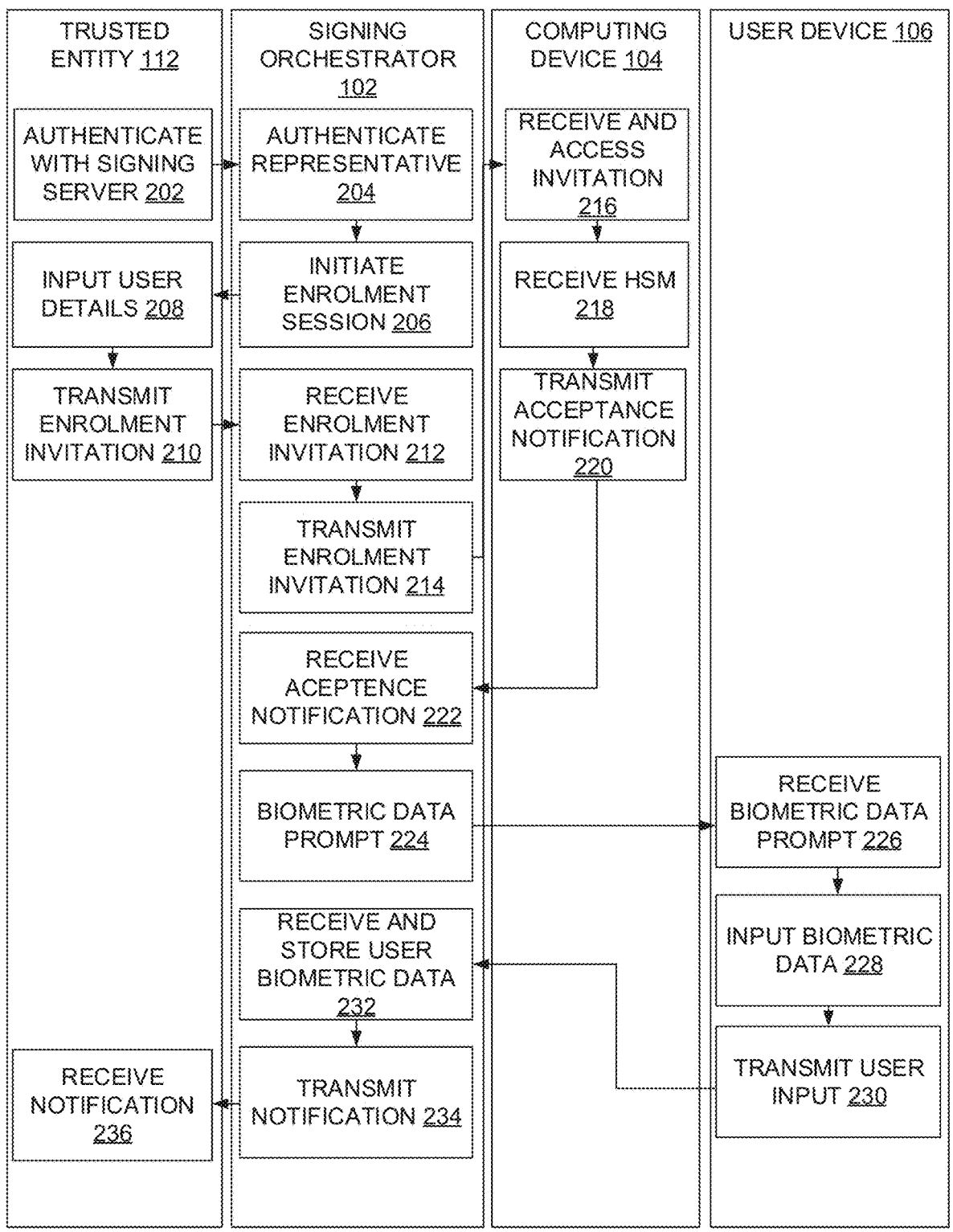
FIG. 2A is a swim-lane flow diagram which illustrates an example embodiment of a method for enrolment of a user in a system for orchestrating digital signing of a document using embedded cryptographic verification of a signing location according to aspects of the present disclosure.

An exemplary method for enrolment of a user in a system for orchestrating digital signing of a document using embedded cryptographic verification of a signing location is shown in FIG. 2A. It should be appreciated that FIG. 2A shows a non-limiting enrolment procedure providing context to the workings of the present invention.

A user may be required to register or enroll as a signor in a signing operation. The user (110) may be enrolled with the assistance of a representative of the trusted entity (112). The representative of the trusted entity (112) may authenticate (202) himself/herself with the signing orchestrator (102) in order to enable the representative to enroll a new user with the server. The representative may be authenticated by means of a name and password combination or any other means of authentication for which the representative has been pre-registered. The signing orchestrator may authenticate (204) the representative and initiate (206) an enrolment session. The enrolment session may be initiated by means of a software application executing on a device of the representative.

Figure 2B:
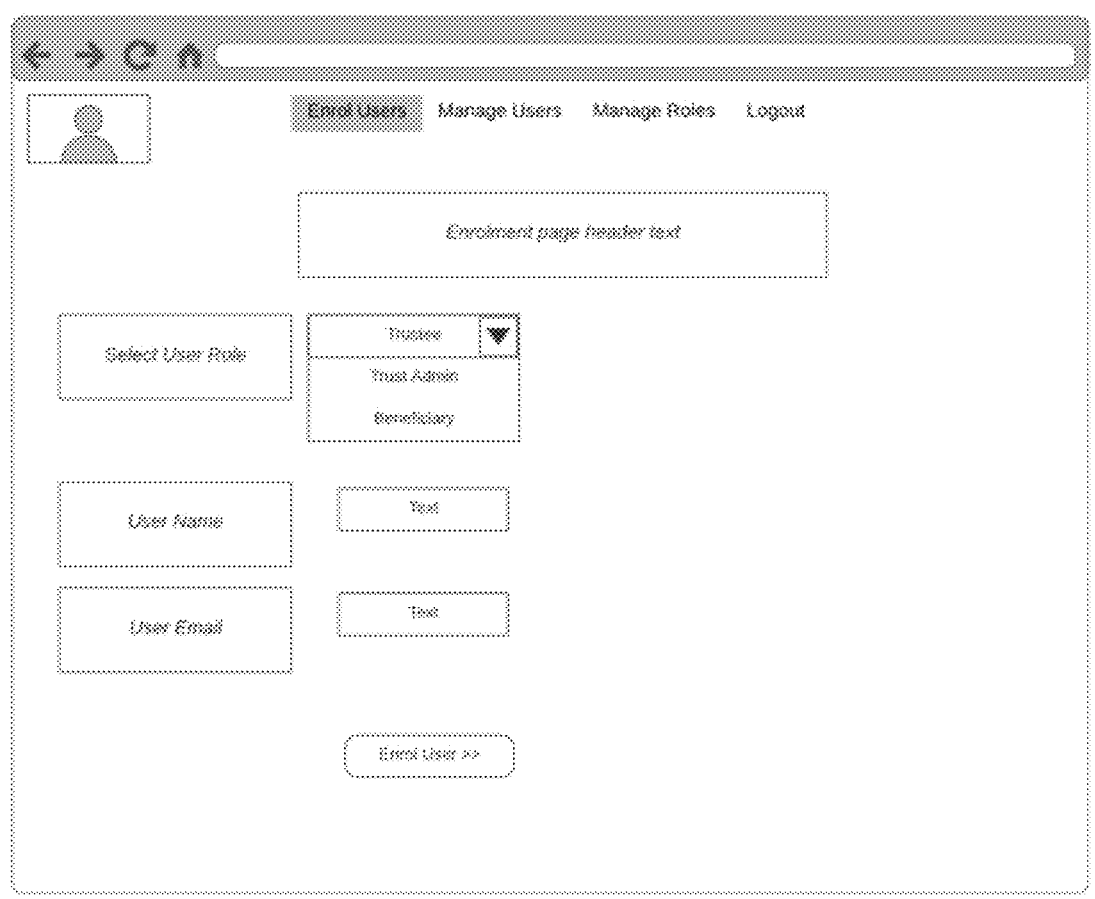
FIG. 2B shows an example embodiment of a user interface component which may be displayed to a representative of a trusted entity during the enrolment of FIG. 2A.

The representative may input (208) the required details of the user (110) required to sign the document and transmit (210) an invite to the signing orchestrator (102) to enroll the user. The details required of the user may include one or more of: a user first name; user surname; user identification number; user age; user role; biometric information; or the like. The user details may be used to identify the user. The provided user details may be stored in the user record (116) maintained by the signing orchestrator. FIG. 2B shows an example embodiment of a user interface component which may be displayed to the representative during the enrolment session.

The signing orchestrator may receive (212) an invitation to enroll the user from the representative and transmit (214) the invitation to the user. The invitation may be transmitted to the user by means of any suitable communication medium, for example, in some embodiments the invitation may be sent to the user by means of an electronic mail, a text message or the like.

The user may receive and access (216) the invitation by means of a computing device (104), or any other suitable device, associated with the user. The invitation may require the user to perform certain tasks in order to be enrolled. In some embodiments, the user may be required to install a software application on the computing device (104) or the user device (106) associated with the user to perform these tasks. The user may further receive (218) the HSM which may be required in order for the user to complete registration. The HSM may be unique to the user and used as an authenticator in the signing system. The HSM may be used to meet the "something I have" requirement in multi-factor authentication. The user may be required to set up the HSM to his/her personal preferences. In some embodiments, the HSM may require a password of the user before the data in the HSM may be accessed. This may be used to meet the "something I know" requirements of two-factor authentication.

Once the user has installed the required app and received the HSM, the user may transmit (220) an invitation acceptance notification to the signing orchestrator (102). The signing orchestrator (102) may receive (222) the invitation acceptance notification and prompt (224) the user for user biometric data. The user may receive (226) the prompt and input (228) the user biometric data.

The user may receive (226) the prompt on the user device (106) on which the software application has been installed. The user biometric data input may be provided by the user via one or more of a fingerprint scanner, voice recognition software, facial recognition software or the like, which may be used to uniquely identify the user. In some embodiments, the user may receive (226) the prompt on the computing device (104) and the user may be required to provide the input by means of a hardware component, such as an external fingerprint scanner, which may be connected to the computing device (104).

The user input may be transmitted (230) to the signing orchestrator (102) which receives and stores (232) the user biometric data in the user record.

The signing orchestrator may transmit (234) a notification to the representative of the trusted entity (112) indicating that the user has performed the required tasks. The representative of the trusted entity may receive (236) the notification which completes the registration process.

It should be appreciated that various embodiments for the registration process may be envisaged. For example, in some embodiments the representative of the trusted entity may be a computing component configured to regulate user enrolment. In some embodiments the user may be required to provide user location data at the time of registration in order to associate the user with a particular location. The location data may be obtained using a GPS, GNSS or telecommunication data of the user device (106).

Figure 3A:
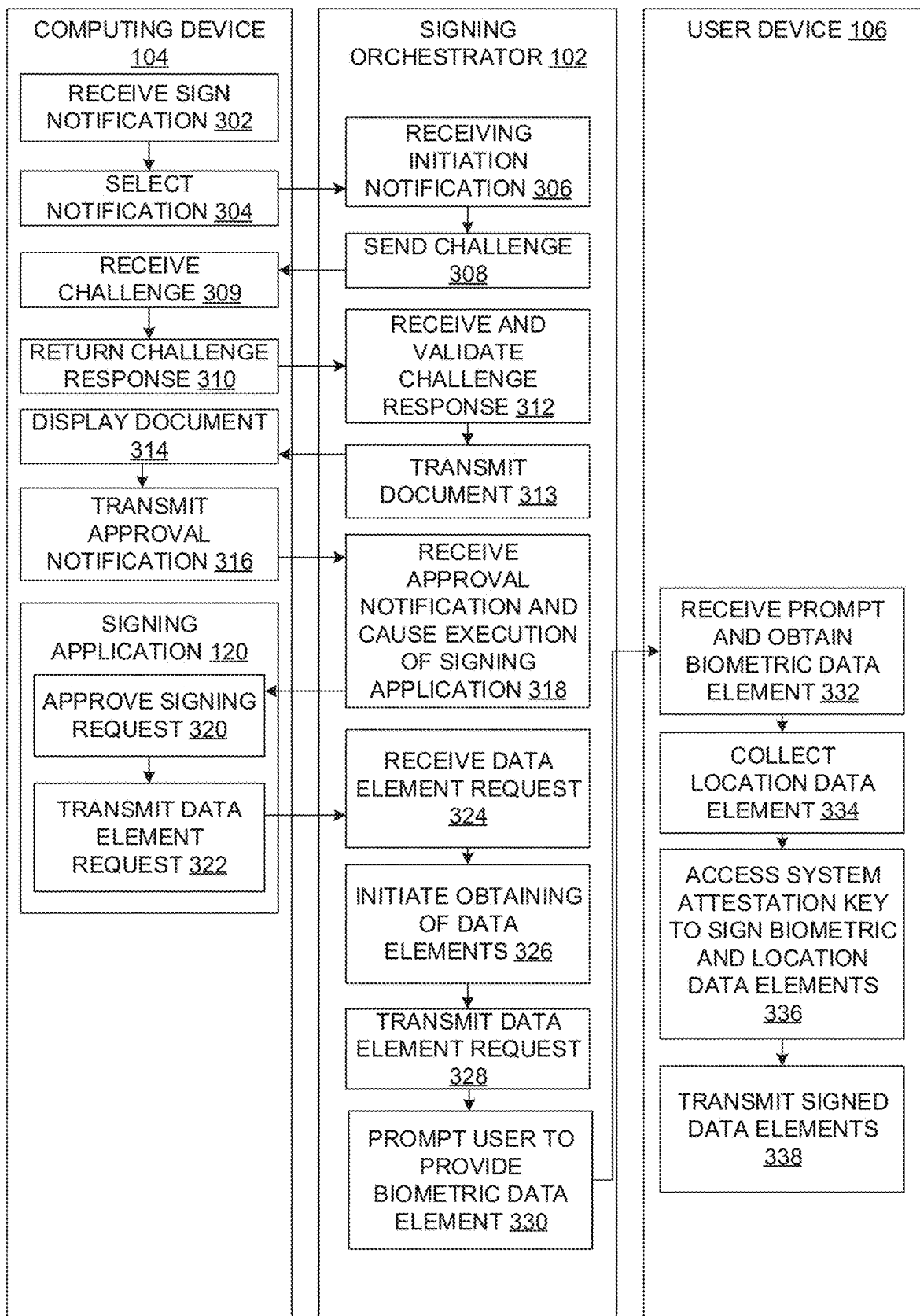
FIG. 3A is a swim-lane flow diagram which illustrates an example embodiment of a method for orchestrating digital signing of a document using embedded cryptographic verification of a signing location according to aspects of the present disclosure.

Referring to FIG. 3A, a swim-lane flow diagram shows a method for orchestrating digital signing of a document using embedded cryptographic verification of a signing location according to an example embodiment. In the example embodiment of FIG. 3A, the signing application (120) is a web application executing via a browser installed and executed on a computing device (104) of the user and the software application is an application executing on a user device (106). The method described with reference to FIG. 3A follows the enrolment procedure described with reference to FIG. 2A. Accordingly, the user (110) of FIG. 3A is a pre-enrolled user.

Figure 3B:
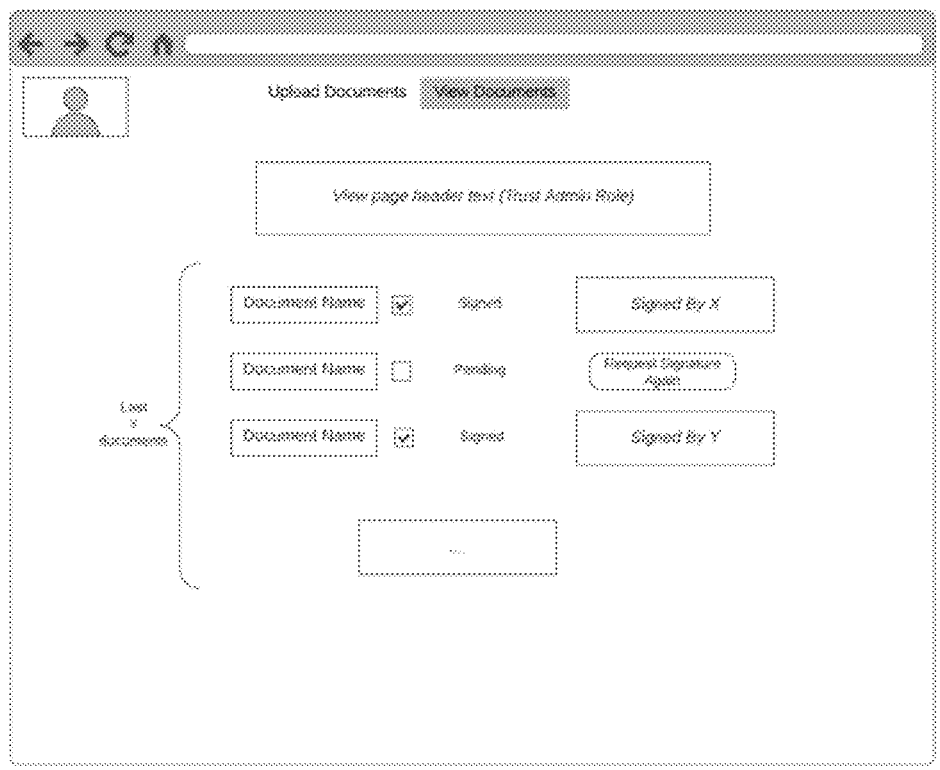
FIG. 3B shows an example embodiment of a user interface component which may be displayed to a representative of a trusted entity during the method of FIG. 3A.

The user (110) may receive (302) a notification indicating that the user is required to sign a document. The notification may be sent by way of any messaging platform such as an email, a text message, as USSD message, or the like, and may be received by the user on a computing device (104). The notification may be transmitted to the computing device (104) in response to the representative of the trusted entity requesting the signature of the user. An example embodiment of a user interface component displayed to the representative of the trusted entity is shown in FIG. 3B. The notification may be configured to include a link which may be selected (304) by the user (110) using the computing device (104) to view the document to be signed. Selecting (304) the link may direct the user to a web application executing on the computing device. This execution of the web application may, in the example embodiment, be termed initiation of a signing session.

The signing orchestrator (102) may receive (306) a notification that the signing session has been initiated and require a user of the computing device (104) to authenticate himself/herself before the user may view or sign the document. The signing orchestrator (102) may send (308) a challenge to the web application executing on the computing device (104). Sending the challenge may include transmitting a message to the computing device (104) requiring the user (110) to present his/her HSM to the system. In some embodiments this may be done by the user simply inserting the HSM into the relevant port of the computing device (104) causing a connection between the HSM and the computing device. The computing device (104) may receive (309) the challenge via the web application and sign the challenge using the cryptographic key(s), which in this embodiment is the private key stored in the HSM and which is accessible to or useable only by the computing device (104) to which the HSM is connected. The web application executing on the computing device (104) may return (310) the signed challenge to the signing orchestrator (102) as a challenge-response.

The signing orchestrator (102) may receive and validate (312) the signed challenge-response. Validating the signed challenge-response may include verifying the signature used to sign the response by using an associated cryptographic key obtained from the user record (116). If the signature matches an expected signature, the signing orchestrator verifies that the user is in possession of a private key matching a public key used during enrolment. In other words, the fact that only a web application executing on a computing device (104) to which the HSM is connected has access to or can use the cryptographic key(s), in this embodiment being the private key, means that only the web application executed on that particular computing device having access to the HSM could have signed the challenge in the manner verified by the signing orchestrator (102) using the corresponding cryptographic key stored in or in association with the user record.

Figure 3C:
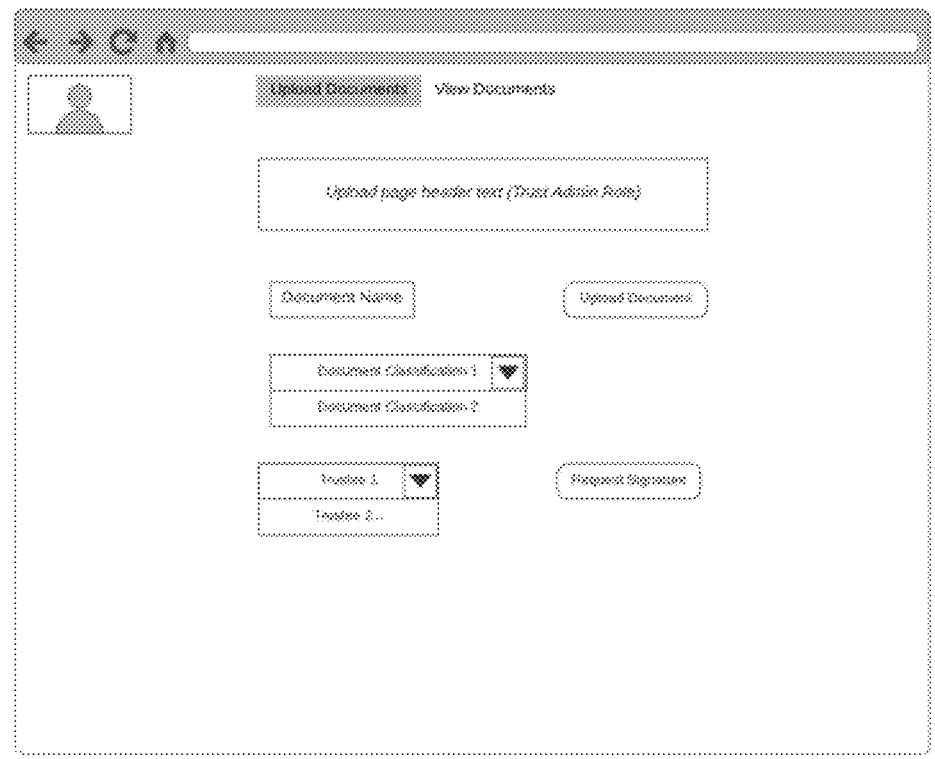
FIG. 3C shows an example embodiment of a user interface component of a signing application which may be displayed to a user during the method of 3A.

Once the challenge-response has been validated (312), the signing orchestrator (102) may transmit (313) and display (314) the document to the user (110) via a display of the computing device (104) for approval by the user that this is the document the user wishes to sign. The user (110) may approve the document to be signed by, in this example embodiment, clicking on a button or link presented to the user by means of the user interface of the web application executing on the computing device (104). The computing device (104) may transmit (316) an approval notification to the signing orchestrator (102). The signing orchestrator may receive the notification and cause (318) the signing application (120) to execute on the computing device (104). FIG. 3C shows an example embodiment of a user interface component of the signing application (120) which may be displayed to the user (110) once the user has approved the document to be signed.

The user (110) may be required to approve or reject the signing request. The user (110) may approve (320) the signing request by selecting the relevant button on the user interface displayed to the user via the signing application (120). The signing application (120) transmits (322) a data element request to the signing orchestrator (102).

The signing orchestrator (102) receives (324) the data element request and initiates (326) obtaining of the data elements. Initiating (326) obtaining of the data elements include the signing orchestrator (102) transmitting (328) a data element request to a user device (106) associated with the user. The signing orchestrator may prompt (330) the user (110) of the user device (106) to provide biometric data elements. In some embodiments the prompt may be in the form of a push notification and include a description of the document to be signed. The description may at least include a document identifier indicating to the user that the prompt is for the document that the user intends to sign. For example, the prompt may include text such as "Please provide fingerprint for signing of document A1234".

The user device (106) to which the prompt is transmitted may have a software application resident and executable thereon via which the prompt may be transmitted from the signing orchestrator. The software application may be installed in the user device during the enrolment procedure as discussed with reference to FIG. 2A.

The user device (106) receives the prompt and obtains (332) a biometric data element, for example by the user providing a fingerprint, or saying a phrase which has been registered at the signing orchestrator during enrolment, via the software application executing on the user device. The user device (106) may be configured to collect (334) a location data element to determine the location of the user device. In some embodiments the location data element may be obtained using a built-in component of the device such as a GPS or GNSS. In some embodiments the location data may be collected using telecommunication data such as cell-ID's in a network infrastructure, an IP address, or the like. It should be appreciated that the location data may be collected in parallel with receiving the prompt, obtaining the biometric data, or as a separate step. transmitting the prompt to the user device (106). It should be appreciated that, in some embodiments, one or more location data elements or one or more biometric data elements may be obtained by the user device.

In some embodiments the user device (106) may be a hardware device having a biometric reader such as an electronic fingerprint scanner, microphone or the like. The location data may for example be obtained by an internal location module provided in the hardware device, or in another device such as the HSM which may be connected to a computing device (104). In such embodiments the signing orchestrator may communicate with the user device (106) via the computing device (104).

The user device (106) may have access to a system attestation key which may be used to sign (336) the biometric data element and the location data element. The system attestation key may be stored in a secure storage location of the user device (106) or a secure storage location of the software application executing on the storage device. The data elements may be signed using the attestation key in order to ensure that the data elements are collected from a registered or enrolled source, such as the user device (106). It may also guard against tampering of the data elements and thereby mitigate fraudulent parties manipulating the data elements. The user device (106) transmits (338) the signed data elements to the signing orchestrator for verification.

The signing orchestrator (102) receives (340) the signed data elements and verifies (342) the authenticity of the signed data elements by using a system attestation certificate associated with the system attestation key. The attestation certificate may be enrolled at the signing orchestrator and stored in a secure storage location thereof. The signing orchestrator (102) may further validate the biometric data element by comparing (344) the biometric data element to biometric data stored in the user record (116) at the signing orchestrator. The biometric data element may be validated if the biometric data element matches the biometric data stored at the signing orchestrator. It should be appreciated that in some embodiments one or more additional documents may have to be signed by the user during the signing session. In such an embodiment the signing orchestrator may store the signed data elements in a temporary storage location, such as a cache memory of the signing orchestrator, at least for the duration of the signing session which may be used for subsequent use for all of the documents to be signed during the signing session. Multiple documents may therefore be signed by one user without having to request the data elements from the user for each document to be signed in a single signing session.

In response to verifying the authenticity of the data, the signing orchestrator (102) generates (346) a payload including one or more of: the location data element; the biometric data element; a timestamp, the document identifier, and document data associated with the document and perform (348) a hash algorithm on the payload to calculate a hash of the payload. The signing orchestrator transmits (350) the hash of the payload and the document identifier to the signing application (120).

The signing application (120) receives (352) the hash of the payload and the document identifier associated with the document to be signed. The signing application (120) prompts the user (110), via the computing device (104) for a passcode associated with the HSM and obtains (354) the passcode from the user by means of a user input on the computing device. The passcode may be a default passcode provided with the HSM, or in some embodiments, the passcode may be a passcode which was stored and registered at the time of enrolment and which may be associated with the user. The signing application (120) transmits (356) the passcode together with the hash of the payload to the HSM in communication with the computing device (104).

The secure module (122) receives (358) the passcode, the hash and verifies (360) the passcode by comparing the passcode provided by the user to the registered passcode. If the passcode does not match the registered passcode, the signing operation is rejected by the secure module (122). If the passcode is verified, the secure module (122) performs (361) a signing operation on the hash. The signed hash is transmitted (362) to the signing application (120). The signing application (120) receives (364) the signed hash and transmits (366) signed hash, the payload and the document identifier to the server to be stored in the user record. The data which is stored in the user record (116) may be used during an auditing process to verify the signed document, the user by whom it was signed, and the location where it was signed by verifying the digital signature over the stored data.

The signing orchestrator (102) transmits (368) a notification to the signing application (120) that the data has been successfully stored. The signing application (120) receives (370) the notification and indicates (372) to the user that the document has been signed.

Figure 4:
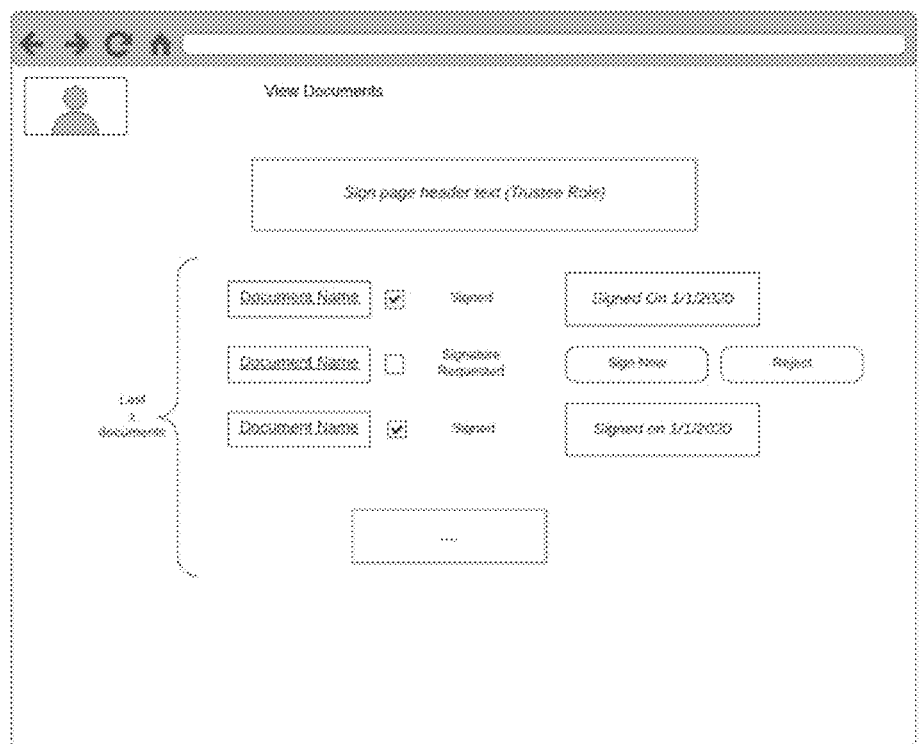
FIG. 4 shows an example embodiment of a user interface component for uploading of a document to be signed.

FIG. 4 shows an example embodiment of a user interface which may be used to upload a document to be signed, classify the document to be signed and to nominate the parties/users required to sign the document. The documents may be uploaded by a representative of the trusted entity or by a user which has been pre-enrolled. In some embodiments the document name in combination with a timestamp of when the document has been uploaded may be used to determine the document identifier.

Figure 5:
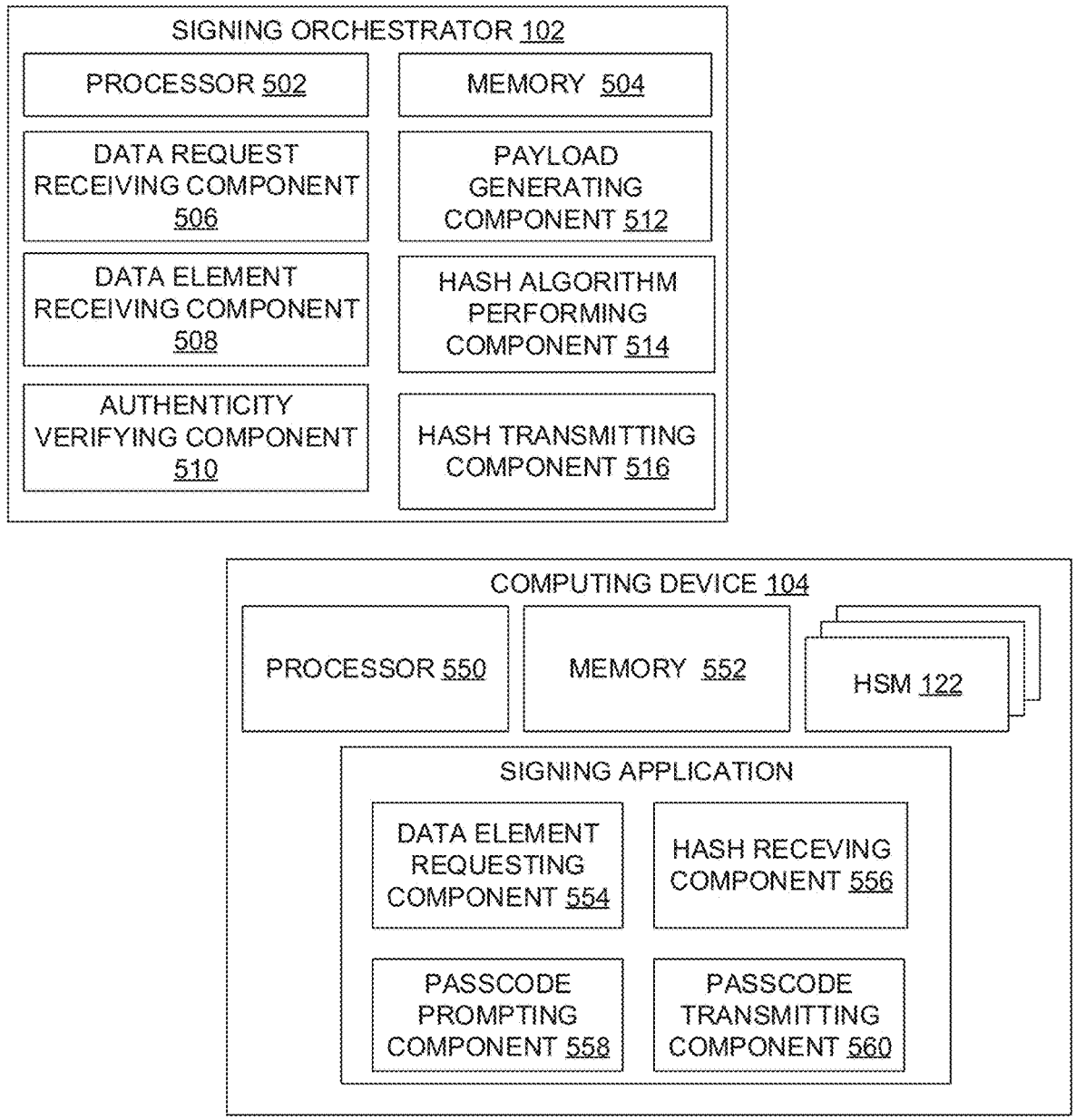
FIG. 5 is a block diagram which illustrates exemplary components which may be provided by a system for orchestrating digital signing of a document using embedded cryptographic verification of a signing location according to aspects of the present disclosure; and, FIG. 6 illustrates an example of a computing device in which various aspects of the disclosure may be implemented.

Various components may be provided for implementing the methods described above with reference to FIGS. 2 to 3. FIG. 5 is a block diagram which illustrates exemplary components which may be provided by a system including a signing orchestrator (102) and a computing device (104) associated with a user for orchestrating digital signing of a document using embedded cryptographic verification of a signing location.

The signing orchestrator (102) may include a processor (502) for executing the functions of components described below, which may be provided by hardware or by software units executing on the signing orchestrator (102). The software units may be stored in a memory component (504) and instructions may be provided to the processor (502) to carry out the functionality of the described components. In some cases, for example in a cloud computing implementation, software units arranged to manage and/or process data on behalf of the signing orchestrator (102) may be provided remotely.

The signing orchestrator (102) may include a data request receiving component (506). The data request receiving component may be configured to receive a request for data elements, including a biometric data element and a location data element, from a signing application (120) executing on the computing device (104). The data request receiving component (506) may initiate obtaining of the data elements from the signing application (120). This may be done by way of sending a prompt to a user device (106) of the user requiring the user to present at least one of the data elements manually.

The signing orchestrator (102) may include a data element receiving component (508) configured to receive signed data elements. The data elements being the data elements obtained from the user device (106). The data elements may be signed in that the user device (106) may be configured to sign the data elements using a system attestation key prior to transmitting the data elements to the signing orchestrator.

The signing orchestrator (102) may include an authenticity verifying component (510). The authenticity verifying component (510) may be configured to verify the authenticity of the signed data elements. The signed data elements may be verified using a system attestation certificate which is enrolled with and stored at the signing orchestrator during the enrolment procedure. The signed data elements may further be verified by comparing the biometric data element to user data stored in a user record. The user data stored in the user record may include user biometric data having been stored in the user record at the time of enrolment. The user data may further include user location data, user identification data or the like.

The signing orchestrator (102) may include a payload generating component (512) configured to, in response to verifying the authenticity of the signed data elements, generate a payload including the location data element and the biometric data element. Additionally, the payload may include a document identifier, the document information/data, a timestamp or the like. The signing orchestrator may include a hash algorithm performing component (514) for performing a hash algorithm on the payload to calculate a hash of the payload.

The signing orchestrator (102) may further include a hash transmitting component (516). The hash transmitting component (516) may be configured to transmit the hash of the payload and a document identifier to the signing application (120) for signing of the document.

The computing device (104) may include a processor (550) for executing the functions of components described below, which may be provided by hardware or by software units executing on the computing device (104). The software units may be stored in a memory component (552) and instructions may be provided to the processor (550) to carry out the functionality of the described components. In some cases, for example in a cloud computing implementation, software units arranged to manage and/or process data on behalf of the computing device (104) may be provided remotely. Some or all of the components may be provided by a signing application (120) downloadable onto and executable on the computing device (104).

The signing application (120) may include a data element requesting component (554) configured to request data elements from a signing orchestrator. The data elements may be used to identify the user initiating a signing request and also to ensure that the user requesting to sign the document is a registered or enrolled user.

The signing application (120) may include a hash receiving component (556). The hash receiving component may receive a hash of a payload including the data elements and a document identifier associated with the document to be signed, wherein the signing orchestrator receives signed data elements, including a location data element and a biometric data element associated with the user, obtained from a user device configured to sign the data elements with an attestation key and verifies the authenticity of the signed data elements using a system attestation certificate and compares the biometric data elements to user data stored in a user record.

The signing application (120) may include a passcode prompting component (558) for prompting the user for a passcode associated with the HSM. The passcode may be a passcode provided to the user during enrolment and may be unique to the HSM. In some embodiments the passcode may be unique to the user and the passcode may be registered with a secure module which may be used to validate the correctness of the passcode once a user has provided the passcode. The signing application (120) may include a passcode transmitting component (560) configured to transmit the user passcode and the hash of the payload to the secure module configured to verify the user passcode and perform signing of the hash. The secure module may be an HSM which may be directly attached to, or integral with the computing device (104) associated with the user.

Figure 6:
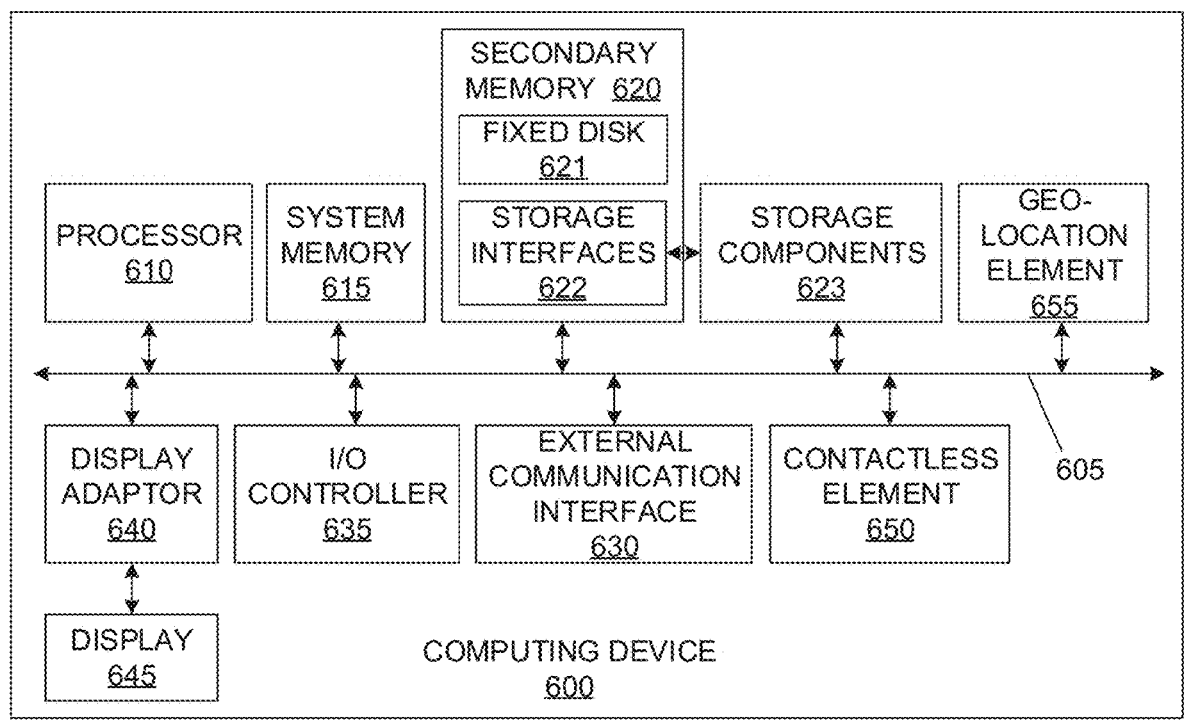

FIG. 6 illustrates an example of a computing device (600) in which various aspects of the disclosure may be implemented. The computing device (600) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (600) may be suitable for storing and executing computer program code. The various participants and elements in the previously described system diagrams may use any suitable number of subsystems or components of the computing device (600) to facilitate the functions described herein. The computing device (600) may include subsystems or components interconnected via a communication infrastructure (605) (for example, a communications bus, a network, etc.). The computing device (600) may include one or more processors (610) and at least one memory component in the form of computer-readable media. The one or more processors (610) may include one or more of: CPUs, graphical processing units (CPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (600) may be distributed over a number of physical locations (e.g. in a distributed, cluster or cloud-based computing configuration) and appropriate software units may be arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software. The memory components may also include secondary memory (620). The secondary memory (620) may include a fixed disk (621), such as a hard disk drive, and, optionally, one or more storage interfaces (622) for interfacing with storage components (623), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (600) may include an external communications interface (630) for operation of the computing device (600) in a networked environment enabling transfer of data between multiple computing devices (600) and/or the Internet. Data transferred via the external communications interface (630) may be in the form of signals, which may be electronic, electromagnetic, optical, radio, or other types of signal. The external communications interface (630) may enable communication of data between the computing device (600) and other computing devices including servers and external storage facilities. Web services may be accessible by and/or from the computing device (600) via the communications interface (630).

The external communications interface (630) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry. The external communications interface (630) may include a subscriber identity module (SIM) in the form of an integrated circuit that stores an international mobile subscriber identity and the related key used to identify and authenticate a subscriber using the computing device (600). One or more subscriber identity modules may be removable from or embedded in the computing device (600).

The external communications interface (630) may further include a contactless element (650), which is typically implemented in the form of a semiconductor chip (or other data storage element) with an associated wireless transfer element, such as an antenna. The contactless element (650) may be associated with (e.g., embedded within) the computing device (600) and data or control instructions transmitted via a cellular network may be applied to the contactless element (650) by means of a contactless element interface (not shown). The contactless element interface may function to permit the exchange of data and/or control instructions between computing device circuitry (and hence the cellular network) and the contactless element (650). The contactless element (650) may be capable of transferring and receiving data using a near field communications capability (or near field communications medium) typically in accordance with a standardized protocol or data transfer mechanism (e.g., ISO 14443/NFC). Near field communications capability may include a short-range communications capability, such as radio-frequency identification (RFID), Bluetooth™, infra-red, or other data transfer capability that can be used to exchange data between the computing device (600) and an interrogation device. Thus, the computing device (600) may be capable of communicating and transferring data and/or control instructions via both a cellular network and near field communications capability.

The computer-readable media in the form of the various memory components may provide storage of computer-executable instructions, data structures, program modules, software units and other data. A computer program product may be provided by a computer-readable medium having stored computer-readable program code executable by the central processor (610). A computer program product may be provided by a non-transient or non-transitory computer-readable medium, or may be provided via a signal or other transient or transitory means via the communications interface (630).

Interconnection via the communication infrastructure (605) allows the one or more processors (610) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (600) either directly or via an I/O controller (635). One or more displays (645) (which may be touch-sensitive displays) may be coupled to or integrally formed with the computing device (600) via a display or video adapter (640).

The computing device (600) may include a geographical location element (655) which is arranged to determine the geographical location of the computing device (600). The geographical location element (655) may for example be implemented by way of a global positioning system (GPS), or similar, receiver module. In some implementations the geographical location element (655) may implement an indoor positioning system, using for example communication channels such as cellular telephone or Wi-Fi™ networks and/or beacons (e.g. Bluetooth™ Low Energy (BLE) beacons, iBeacons™, etc.) to determine or approximate the geographical location of the computing device (600). In some implementations, the geographical location element (655) may implement inertial navigation to track and determine the geographical location of the communication device using an initial set point and inertial measurement data.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method for orchestrating digital signing of a document using embedded cryptographic verification of a signing location conducted at a signing orchestrator, the method comprising:
   receiving a request for data elements from a signing application and, in response to receiving the request, initiating obtaining of the data elements;
   receiving signed data elements, including a location data element and a biometric data element associated with a user, the data elements having been obtained from a user device configured to sign the data elements with an attestation key;
   verifying the authenticity of the signed data elements using a system attestation certificate and comparing the biometric data element to user data stored in a user record;
   in response to verifying the signed data elements, generating a payload including the location data element, the biometric data element, and data associated with the document and performing a hash algorithm on the payload to calculate a hash of the payload; and
   transmitting the hash of the payload and a document identifier to the signing application for signing of the document.

2. The method as claimed in claim 1, wherein initiating obtaining the data elements includes transmitting a data element request to the user device, the user device prompting the user to provide the biometric data element.

3. The method as claimed in claim 2, wherein prompting the user to provide the biometric data element includes presenting the user with a description of the document to be signed.

4. The method as claimed in claim 1, wherein the data element is signed with a system attestation key associated with the attestation certificate and stored in a secure storage of the user device.

5. The method as claimed in claim 4, wherein the attestation certificate is enrolled at the signing orchestrator and used to verify the authenticity of the data element signed with the system attestation key.

6. The method as claimed in claim 1, wherein the payload including the data element additionally includes at least one of a timestamp and the document identifier.

7. The method as claimed in claim 1, wherein the user data stored in the user record includes user biometric data and user location data obtained from the user during an enrolment process.

8. The method as claimed in claim 7, wherein the step of comparing the biometric data element to user data stored in a user record includes comparing the biometric data element to the user biometric data obtained from the user during the enrolment process.

9. The method as claimed in claim 1, including initiating a signing session in response to receiving the signing request, and wherein the signed data elements are stored in a storage location of the signing orchestrator at least for the duration of the signing session.

10. The method as claimed in claim 9, wherein if one or more additional documents are to be signed during the signing session, using the stored signed data elements to generate a payload for each of the one or more additional documents.

11. The method as claimed in claim 1, wherein the signing application is a web-based application executing on a computing device associated with the user.

12. A computer-implemented method for orchestrating digital signing of a document using embedded cryptographic verification of a signing location, the method being conducted at a signing application executing on a computing device associated with a user and comprising:
   requesting data elements from a signing orchestrator for identifying the user initiating a signing request;
   receiving a hash of a payload including the data elements and data associated with the document, and a document identifier, wherein the signing orchestrator receives signed data elements, including a location data element and a biometric data element associated with the user, obtained from a user device configured to sign the data elements with an attestation key and verifies the authenticity of the signed data elements using a system attestation certificate and compares the biometric data element to user data stored in a user record;
   prompting the user for a passcode associated with a secure module; and
   transmitting the user passcode and the hash of the payload to the secure module configured to verify the user passcode and perform signing of the hash.

13. The method as claimed in claim 12, including receiving the signed hash from the secure module and transmitting the signed hash to the signing orchestrator, wherein the signing orchestrator stores the signed hash for subsequent use.

14. The method as claimed in claim 12, wherein the secure module is a Hardware Security Module (HSM) configured to store a private key unique to the user, and wherein the private key is used to cryptographically sign the hash.

15. A non-transitory computer readable storage medium storing a program comprising program instructions that when executed on at least one processor of a computer or loaded onto the at least one processor of the computer, causes the computer to perform a method for orchestrating digital signing of a document using embedded cryptographic verification of a signing location conducted at a signing orchestrator by:
   receiving a request for data elements from a signing application and, in response to receiving the request, initiating obtaining of the data elements;
   receiving signed data elements, including a location data element and a biometric data element associated with a user, the data elements having been obtained from a user device configured to sign the data elements with an attestation key;
   verifying the authenticity of the signed data elements using a system attestation certificate and comparing the biometric data element to user data stored in a user record;
   in response to verifying the signed data elements, generating a payload including the location data element, the biometric data element, and data associated with the document and performing a hash algorithm on the payload to calculate a hash of the payload; and transmitting the hash of the payload and a document identifier to the signing application for signing of the document.

16. The non-transitory computer readable storage medium as claimed in claim 15, further comprising:

requesting data elements from a signing orchestrator for identifying the user initiating a signing request;

receiving a hash of a payload including the data elements and data associated with the document, and a document identifier, wherein the signing orchestrator receives signed data elements, including a location data element and a biometric data element associated with the user, obtained from a user device configured to sign the data elements with an attestation key and verifies the authenticity of the signed data elements using a system attestation certificate and compares the biometric data element to user data stored in a user record;

prompting the user for a passcode associated with a secure module; and transmitting the user passcode and the hash of the payload to the secure module configured to verify the user passcode and perform signing of the hash.

17. The non-transitory computer readable storage medium as claimed in claim 16, wherein the secure module is directly attached to, or integral with the computing device associated with the user.

\* \* \* \* \*

UNITED STATES PATENT AND TRADEMARK OFFICE
CERTIFICATE OF CORRECTION

| | |
|---|---|
| PATENT NO. | : 12,231,576 B2 |
| APPLICATION NO. | : 17/591136 |
| DATED | : February 18, 2025 |
| INVENTOR(S) | : Jacobus Grobler |

Page 1 of 1

It is certified that error appears in the above-identified patent and that said Letters Patent is hereby corrected as shown below:

On the Title Page

Please add the following priority information:
-- (30) Foreign Application Priority Data
February 2, 2021 (GB) 2101434 --

Signed and Sealed this
Eighth Day of July, 2025

Coke Morgan Stewart
*Acting Director of the United States Patent and Trademark Office*